(12) United States Patent
Yoshimura et al.

(10) Patent No.: US 7,506,142 B2
(45) Date of Patent: Mar. 17, 2009

(54) METHOD FOR CONFIGURING DEVICE DRIVER BY CUSTOMIZING SAME USER SETTING USING IN DIFFERENT IMAGE PROCESSING DEVICES

(75) Inventors: Tomonari Yoshimura, Kyoto (JP); Yoichi Kawabuchi, Itami (JP); Daisuke Sakiyama, Kawanishi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 395 days.

(21) Appl. No.: 11/240,387

(22) Filed: Oct. 3, 2005

(65) Prior Publication Data

US 2006/0230261 A1    Oct. 12, 2006

(30) Foreign Application Priority Data

Apr. 12, 2005    (JP)    ............................. 2005-114862

(51) Int. Cl.
   *G06F 9/00*    (2006.01)
(52) U.S. Cl. ........................... 713/1; 358/1.15; 719/327
(58) Field of Classification Search ..................... 713/1; 719/321, 323, 324, 327; 358/1.15
   See application file for complete search history.

(56) References Cited

U.S. PATENT DOCUMENTS 6,839,681 B1 *    1/2005    Hotz ............................. 705/10
2003/0041127 A1 *    2/2003    Turnbull ..................... 709/220
2003/0233644 A1 *    12/2003    Cohen et al. ................. 717/171
2004/0034862 A1    2/2004    Kadota
2005/0159926 A1 *    7/2005    Saito .......................... 702/186

FOREIGN PATENT DOCUMENTS

| JP | 2001-306279 | 11/2001 |
| JP | 2003-256172 | 9/2003 |
| JP | 2004-171327 A | 6/2004 |

OTHER PUBLICATIONS

Official Action (Notification of Reasons for Refusal) issued by the Japanese Patent Office in corresponding JP Patent Appln. No. 2005-114862; Jun. 26, 2007; and Verified English translation thereof.

\* cited by examiner

*Primary Examiner*—Chun Cao
(74) *Attorney, Agent, or Firm*—Buchanan Ingersoll & Rooney PC (57) ABSTRACT

A device driver customizing method that is performed when a second driver is installed in an information processing device in which one or more first drivers each for controlling an image processing device have been already installed, the driver customizing method comprising: a searching step of comparing items included in first configuration data of any of the first drivers, which have been already configured by a user, with items included in second configuration data of the second driver, which are to be newly configured by the user, and thereby searching the first configuration data for an item corresponding to one of the items included in the second configuration data; and a configuration step of configuring the one of the items included in the second configuration data to have a same value as a value given to the corresponding item, if the corresponding item has been found by the searching step.

15 Claims, 12 Drawing Sheets

| PAGE SIZE | A4 |
|---|---|
| PAPER FEED TRAY | CASSETTE 3 |
| ORIENTATION | PORTRAIT |
| PAGE LAYOUT | 2 PAGES PER SHEET |
| DUPLEX | BOTH SIDES |
| COPIES | 5 |
| SORT | ON |
| PUNCH | OFF |
| OUTPUT TRAY | TRAY 2 |
| CONFIDENTIAL PRINT | ON |
| JOB NAME | Konicaminolta |
| CODE | 1234 |
| CONTROL NUMBER | OFF |
| RESOLUTION | 1200dpi |
| FONT | PRINTER FONT |

| | 25 |
|---|---|
| PAGE SIZE | A4 |
| PAPER FEED TRAY | CASSETTE 1 |
| ORIENTATION | PORTRAIT |
| PAGE LAYOUT | 1 PAGE PER SHEET |
| DUPLEX | ONE SIDE |
| COPIES | 1 |
| SORT | ON |
| PUNCH | OFF |
| STAPLE | OFF |
| OUTPUT TRAY | STANDARD |
| CONFIDENTIAL PRINT | OFF |
| JOB NAME | — |
| CODE | — |
| CONTROL NUMBER | OFF |
| RESOLUTION | 600dpi |
| FONT | STANDARD |

FIG.10

| PAGE SIZE | A4 |
|---|---|
| PAPER FEED TRAY | CASSETTE 3 |
| ORIENTATION | PORTRAIT |
| PAGE LAYOUT | 2 PAGES PER SHEET |
| DUPLEX | BOTH SIDES |
| COPIES | 5 |
| SORT | ON |
| PUNCH | OFF |
| STAPLE | OFF |
| OUTPUT TRAY | TRAY 2 |
| CONFIDENTIAL PRINT | ON |
| JOB NAME | Konicaminolta |
| CODE | 1234 |
| CONTROL NUMBER | OFF |
| RESOLUTION | 1200dpi |
| FONT | PRINTER FONT |

METHOD FOR CONFIGURING DEVICE DRIVER BY CUSTOMIZING SAME USER SETTING USING IN DIFFERENT IMAGE PROCESSING DEVICES

CROSS-REFERENCE TO RELATED APPLICATION

This application is based on application No. 2005-114862 filed in Japan, the content of which is hereby incorporated by reference.

BACKGROUND OF THE INVENTION (1) Field of the Invention

The present invention relates to a technique to configure a device driver of an image processing device.

(2) Description of the Related Art

To control a printer from a terminal device, it is necessary to install a printer driver in the terminal device. By starting up a configuration dialog box for the printer driver and inputting printing conditions (values) from the configuration dialog box, the user can print out a document or the like, which is stored in the terminal device, in a desired format.

Regarding such a printer driver, there is a technique for using print conditions customized by the user as values to be displayed when the configuration dialog box is started up. In this technique, the terminal device stores a driver configuration file in the memory thereof, and reads the file before printing out the document to configure the printer driver. Accordingly, once the user customizes the conditions to suit preferences of the user, the conditions will be reflected on the configuration dialog box from the next printing. As a result, the technique lightens the workload of the user, because it becomes unnecessary for the user to input all the printing conditions every time.

However, to use a new printer that is newly connected to the terminal device, the user has to install another printer driver, which supports the new printer, in the terminal device. Default values have been preset for the newly installed printer driver. Therefore, the user has to input the printing conditions again for the new driver. This is a problem from the viewpoint of convenience of the user.

SUMMARY OF THE INVENTION

To solve the problem, the object of the present invention is to provide a device driver customizing method, a program, a recording medium, and an information processing device with which the user can save time configuring a driver when a new driver for controlling a new image processing device is installed in the information processing device in which an old driver for controlling an old image processing device has been already installed.

The above object is fulfilled by a device driver customizing method that is performed when a second driver is installed in an information processing device in which one or more first drivers each for controlling an image processing device have been already installed, the second driver being different from any of the first drivers, and the driver customizing method comprising: a searching step of comparing items included in first configuration data of any of the first drivers, which have been already configured by a user, with items included in second configuration data of the second driver, which are to be newly configured by the user, and thereby searching the first configuration data for an item corresponding to one of the items included in the second configuration data; and a configuration step of configuring the one of the items included in the second configuration data to have a same value as a value given to the corresponding item, if the corresponding item has been found by the searching step. In this specification, "when a second driver is installed" includes a time during the installation of the second driver, a time when the installation has just finished, and a time a predetermined period after the installation has finished.

Also, the above object is fulfilled a computer program that is executed when a second driver is installed in an information processing device in which one or more first drivers each for controlling an image processing device have been already installed, the second driver being different from any of the first drivers, and the driver customizing method comprising: a searching step of comparing items included in first configuration data of any of the first drivers, which have been already configured by a user, with items included in second configuration data of the second driver, which are to be newly configured by the user, and thereby searching the first configuration data for an item corresponding to one of the items included in the second configuration data; and a configuration step of configuring the one of the items included in the second configuration data to have a same value as a value given to the corresponding item, if the corresponding item has been found by the searching step.

With the stated structure, if there is any item that is included in both the first configuration data and the second configuration data, the configuration of the already installed driver is automatically inherited by the second configuration data without change. Accordingly, the user can save time configuring the second driver. Further, with the stated structure, the user can immediately use the new image processing device with the configuration that the user is familiar with. This means that the structure provides for the convenience of the user.

Here, it is preferable that the device driver customizing method further comprises a receiving step of receiving, from the user, an indication of a first driver, among said one or more first drivers, whose first configuration data should be searched. With the stated structure, the configuration of the driver desired by the user is to be inherited by the new driver. This provides for the convenience of the user.

Here, it is preferable that the configuration step configures the one of the items included in the second configuration data to have a default value, if unable to configure the one of the items included in the second configuration data to have a same value as a value given to the corresponding item. Also, it is preferable that the configuration step configures the one of the items included in the second configuration data to have a default value, if the corresponding item has not been found by the searching step. The stated structure can prevent that the second driver is configured unexpectedly.

Here, it is preferable that the device driver customizing method further comprises: an inheritance indication receiving step of receiving, from the user, an indication as to whether a value given to the corresponding item should be inherited by the one of the items included in the second configuration data, wherein the inheritance indication receiving step is performed prior to the searching step, and the searching step is performed only if the received indication indicates that the value given to the corresponding item should be inherited by the one of the items included in the second configuration data. With the stated structure, the user can determine whether the configuration of the already installed driver should be inherited by the new driver. If the inheritance is not desired by the user, useless procedures for the user can be omitted.

Here, it is preferable that if an address of the image processing device controlled by said any of the first drivers is the same as an address of an image processing device controlled by the second driver, the searching step searches the first configuration data of a first driver, among said one or more first drivers, which is for controlling the image processing device having the same address. With the stated structure, if the image processing device is replaced by a new image processing device without changing the address, the configuration of the already installed drive is inherited as the configuration of the second driver. Accordingly, the user can immediately use the new image processing device with the configuration that the user is familiar with, which means that the structure provides for the convenience of the user.

The above object is fulfilled by a computer-readable recording medium having recorded thereon a computer program that is executed when a second driver is installed in an information processing device in which one or more first drivers each for controlling an image processing device have been already installed, the second driver being different from any of the first drivers, and the driver customizing method comprising: a searching step of comparing items included in first configuration data of any of the first drivers, which have been already configured by a user, with items included in second configuration data of the second driver, which are to be newly configured by the user, and thereby searching the first configuration data for an item corresponding to one of the items included in the second configuration data; and a configuration step of configuring the one of the items included in the second configuration data to have a same value as a value given to the corresponding item, if the corresponding item has been found by the searching step.

The above object is also fulfilled by an information processing device, comprising: a searching unit operable to compare items included in first configuration data of any of one or more first drivers each for controlling an image processing device, with items included in second configuration data of a second driver, and thereby search the first configuration data for an item corresponding to the one of the items included in the second configuration data, said one or more first drivers having been already installed in the information processing device, the items included in the first configuration data having been already configured by a user, and the items included in the second configuration data being to be newly configured by the user; and a configuration unit operable to configure the one of the items included in the second configuration data to have a same value as a value given to the corresponding item, if the corresponding item has been found by the searching unit.

With the stated structure, if there is any item that is included in the first configuration data and the second configuration data in common, the configuration of the already installed driver is automatically inherited by the second configuration data without change. Accordingly, the user can save time configuring the second driver.

BRIEF DESCRIPTION OF THE DRAWINGS

These and the other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENTS

The following describes a driver customizing method, a program, recording medium and an information processing device according to embodiments of the present invention, with reference to the drawings.

Figure 1:
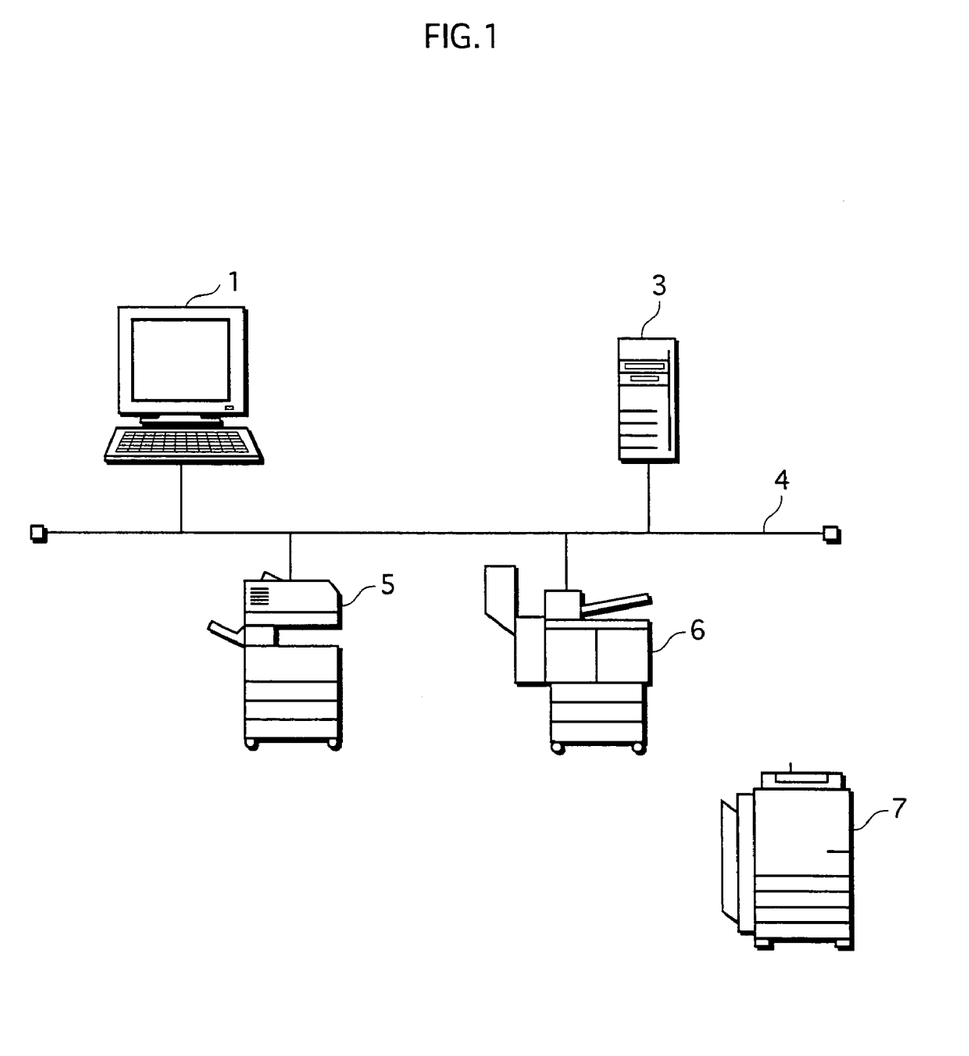
FIG. 1 shows a structure of a system according to embodiments of the present invention.

FIG. 1 shows the structure of a system according to embodiments of the present invention.

In the system shown in FIG. 1, a terminal device (information processing device) 1, a server 3 and printers 5 and 6 are connected together by a network 4 so that each transmits and receives several types of data in conformity with TCP/IP (Transmission Control Protocol/Internet Protocol). In FIG. 1, the network 4 is a LAN (Local Area Network).

The printers 5 and 6 are MFPs (Multiple Function Peripherals), each having functions of executing several types of jobs, such as a copy job and a print job. The copy job is for reading an image printed on a document to obtain an image data, and printing the image based on the image data. The print job is for receiving an instruction for printing from an external terminal, such as the terminal device 1, and performing printing.

The server 3 in this embodiment includes a plurality of printer drivers (Hereinafter simply called the drivers) used for controlling the printers. The server 3 outputs driver data to a terminal device 1 that is connected by the LAN 4 in response to an instruction received from the terminal device 1.

Figure 2:
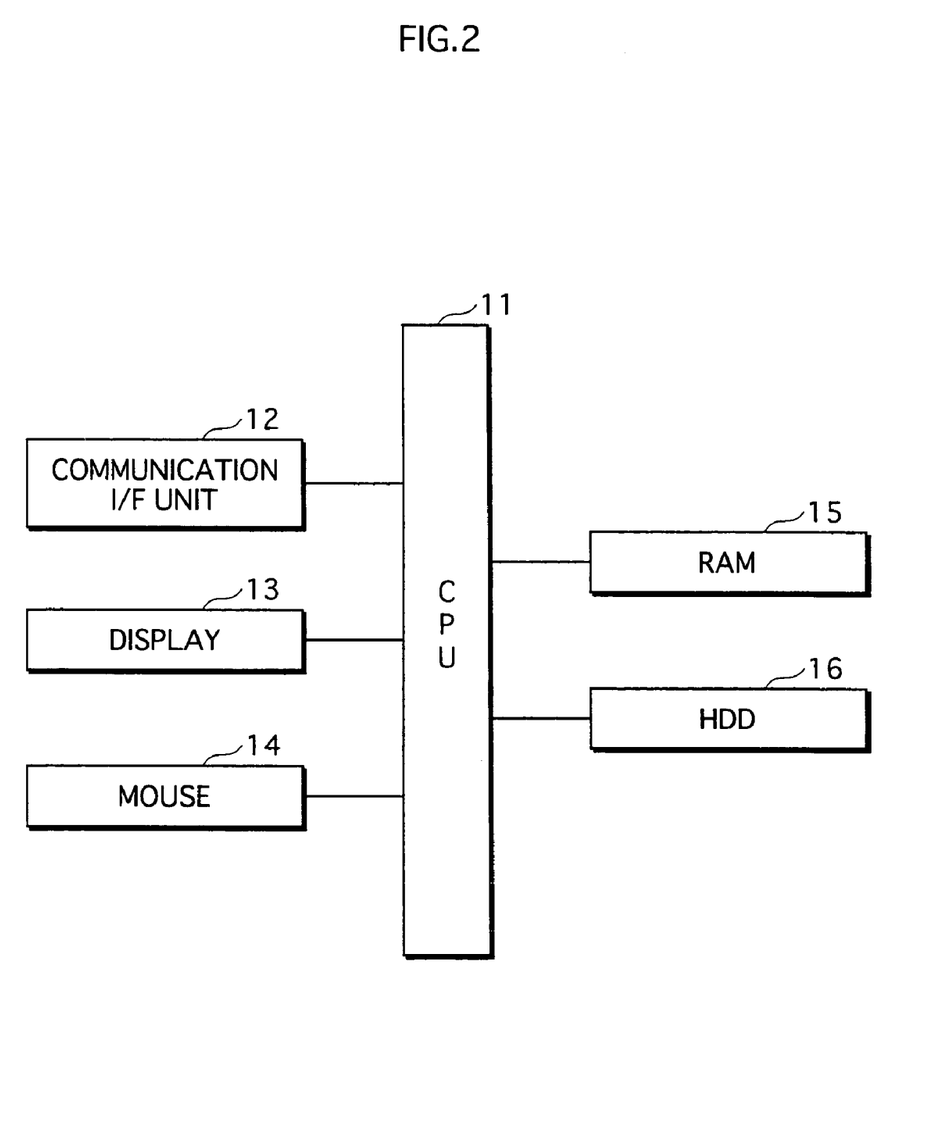
FIG. 2 is a block diagram showing a structure of a terminal device.

FIG. 2 is a block diagram showing the structure of the terminal device 1.

The terminal device 1 is a personal computer (PC) for instance, and it includes a CPU 11, a communication I/F unit 12, a display 13, a mouse 14, a RAM 15, and a hard disk drive (HDD) 16.

The CPU 11 controls the display 13, and receives input from the mouse 14. The CPU 11 also operates the OS (Operation System), applications, drivers, and so on.

The communication I/F unit 12, which is an interface for the connection to the LAN 4, includes a LAN card, a LAN board, or the like.

The display 13 includes a liquid crystal display device or the like, for instance. In this embodiment, the display 13 displays, for instance, a dialog box used for configuring the printing conditions.

The mouse 14 is used by a user to give instructions to the CPU 11. The user moves a pointer of the mouse 14 displayed on the display 13 and presses a button to give the instructions.

The RAM 15 functions as a main memory of the CPU 11, as a work area, and so on. The RAM 15 stores temporal data which is generated when programs are executed.

The HDD 16 stores the OS and the application software. In this embodiment, the HDD 16 stores at least drivers for controlling the printers 5 and 6, and a program for automatically configuring the drivers. The program is described later.

Figure 3:
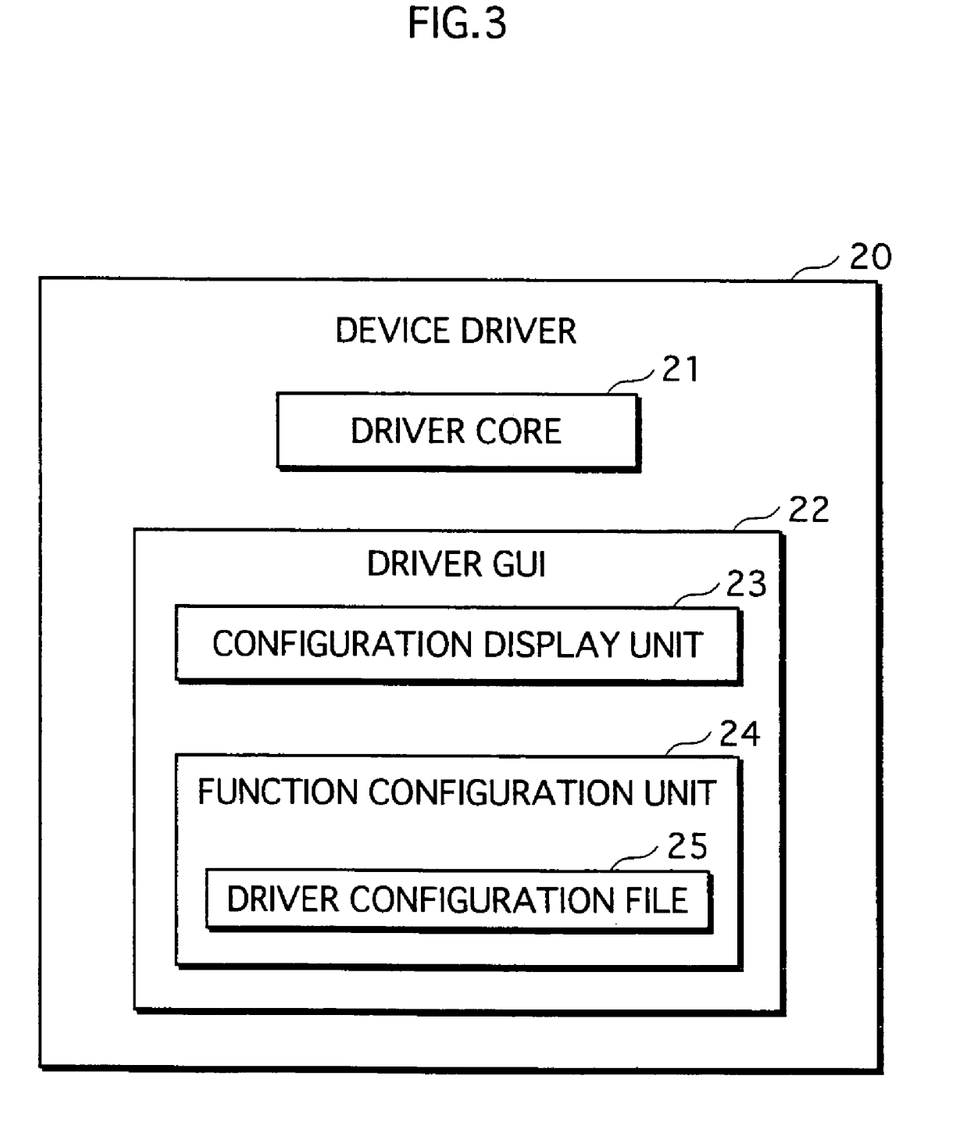
FIG. 3 shows a software structure of a device driver that is installed in a terminal device.

FIG. 3 shows the software structure of a device driver installed in the HDD 16.

As FIG. 3 shows, a device driver 20 includes a driver core 21 and a driver GUI (Graphical User Interface) 22.

The driver GUI 22 includes a configuration display unit 23 and a function configuration unit 24.

Figure 4:
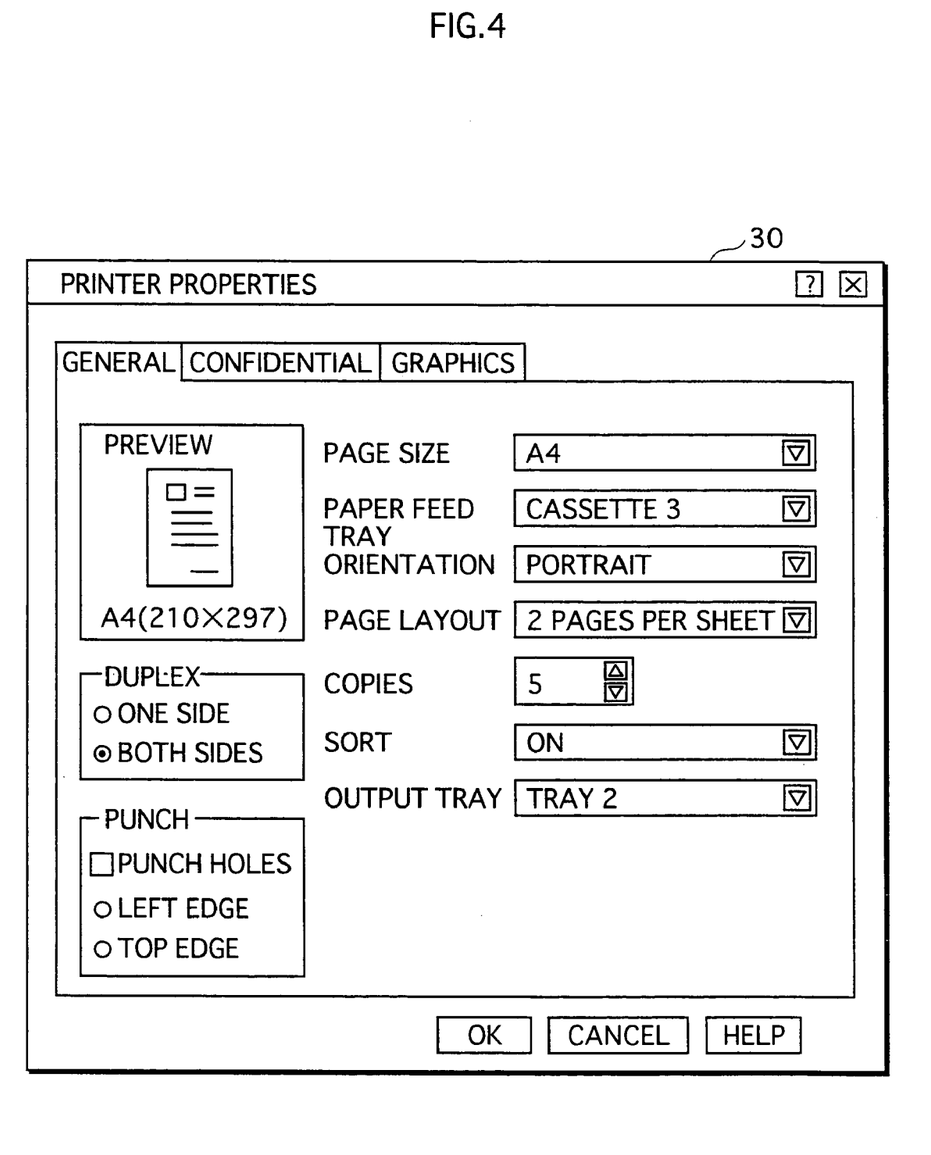
FIG. 4 shows an example of a print configuration dialog box.

The configuration display unit 23 is called when the user inputs an instruction for printing from application software, and displays a print configuration dialog box on the display 13 for receiving the printing conditions. FIG. 4 shows an example of a print configuration dialog box 30. The user can set the print conditions by selecting a value for each item with the mouse 14.

Figure 5:
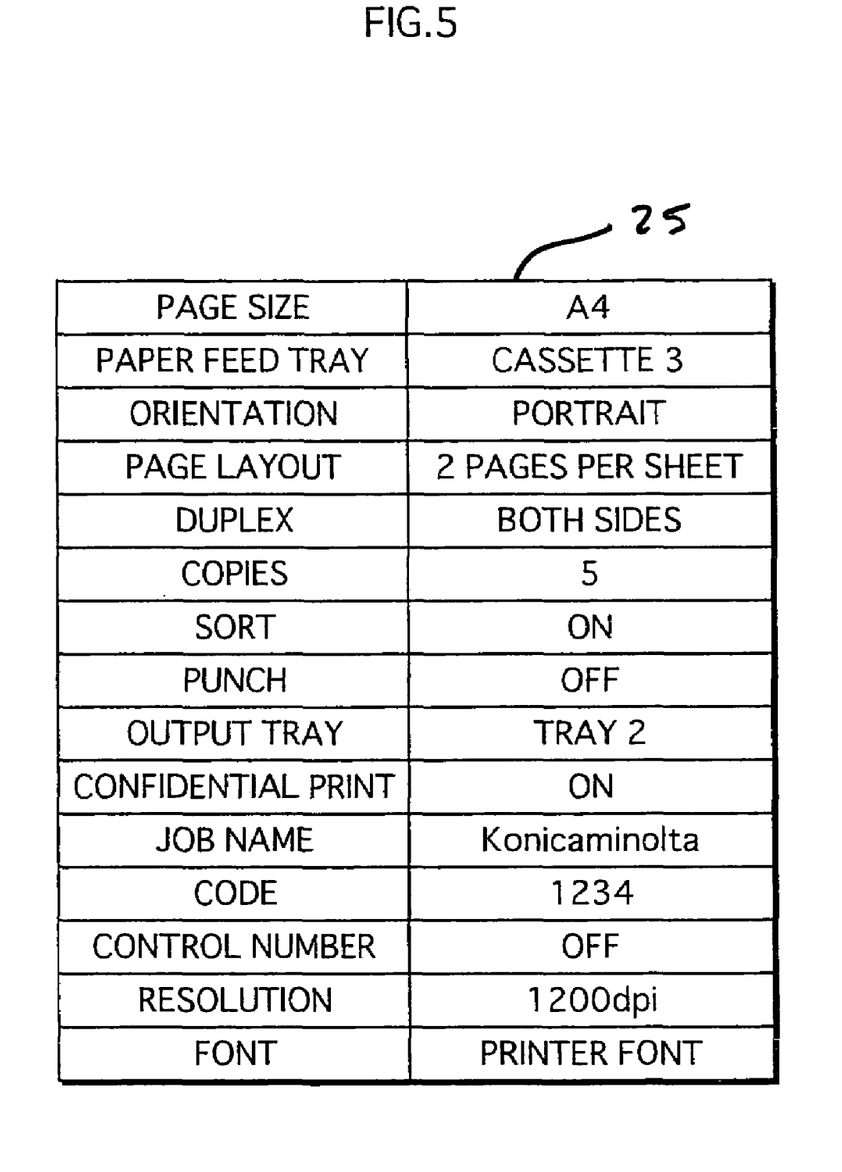
FIG. 5 shows an example of data included in a driver configuration file when printing conditions are set as the print configuration dialog box of FIG. 4 shows.

In FIG. 3, the function configuration unit 24 stores the print conditions that are input by the user from the print configuration dialog box 30. The function configuration unit 24 stores the print conditions as a driver configuration file 25. FIG. 5 shows an example of data included in the driver configuration file 25. When the print conditions are changed through the print configuration dialog box 30, the driver configuration file 25 is overwritten with the new print conditions.

Receiving the instruction for printing, the function configuration unit 24 transmits the data included in the driver configuration file 25, as the print conditions, to the driver core 21.

Upon receiving the print conditions from the function configuration unit 24, the driver core 24 generates a job based on the received print conditions, transmits the generated job as a print request to the printer, and causes the printer to perform the printing. With the stated structure, the user can configure the print conditions from the terminal device 1 by starting up the print configuration dialog box 30 and inputting the print conditions.

Next, the following describes the procedures performed by the terminal device 1 shown in FIG. 1 when the printer 6 connected to the LAN 4 is replaced by a printer 7 having the same IP address as the printer 6. Here, in this embodiment, assume that the driver for controlling the printer 5 and the driver for controlling the printer 6 have been already installed in the terminal device 1.

To make the printer 7 controllable from the terminal device 1, the user has to install a driver for controlling the printer 7, which is different from the already installed drivers, in the terminal device 1 (Such a driver is hereinafter called "a new driver"). In this embodiment, the new driver supporting the printer 7 is stored in the server 3. The user downloads the new driver from the server 3, and installs the new driver in the terminal device 1.

Figure 6:
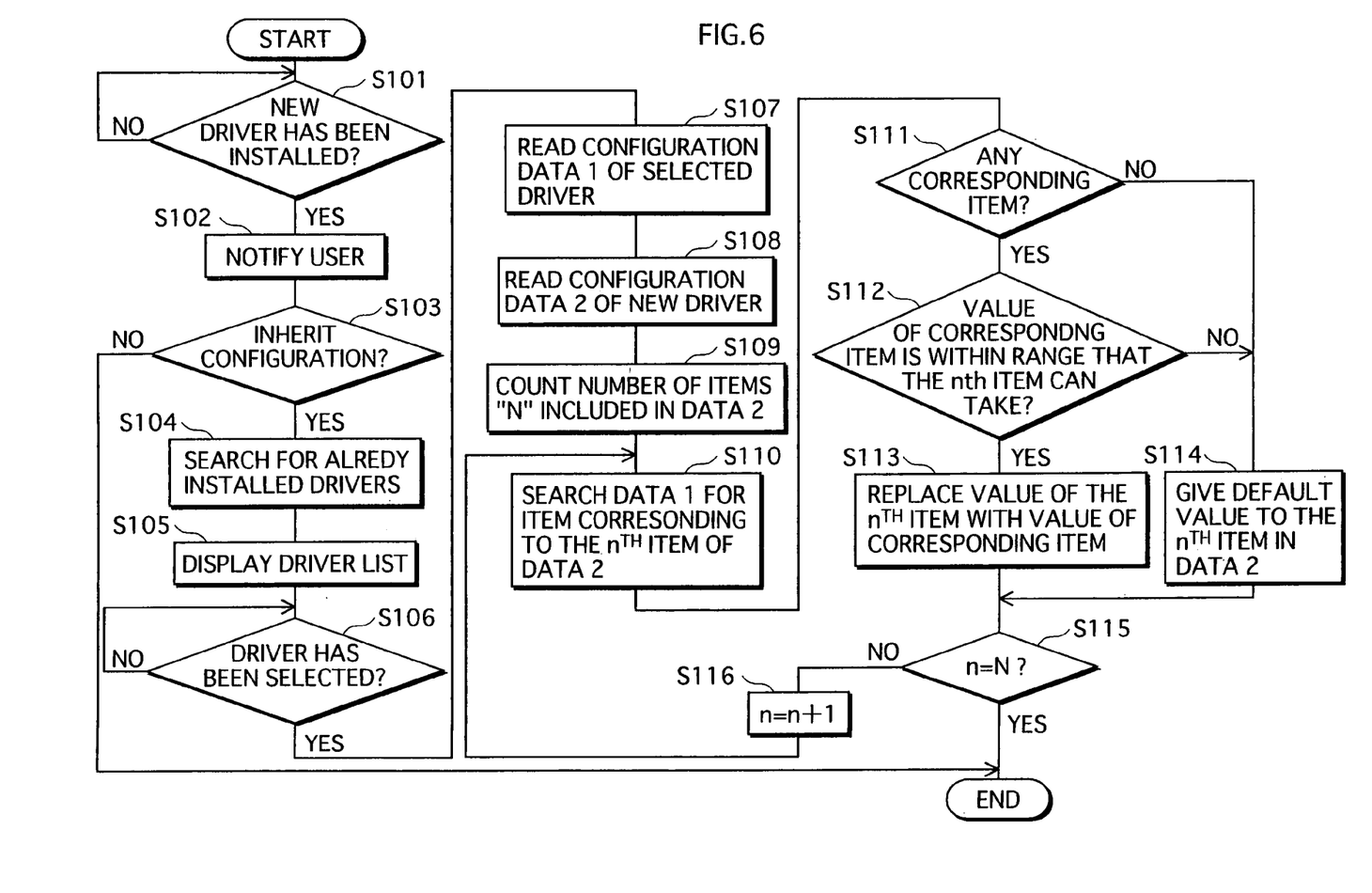
FIG. 6 is a flowchart showing an algorithm of a program used for automatically configuring a driver, which is executed by a terminal device in the case where a different driver is installed in the terminal device.

The following describe the driver customizing method performed by the terminal device 1 at the time of the installation of the new driver, with reference to FIG. 6. FIG. 6 is a flowchart showing an algorithm of a program used for automatically configuring the driver, which is executed by the terminal device 1 in the case where the new driver is installed in the terminal device 1.

Figure 7:
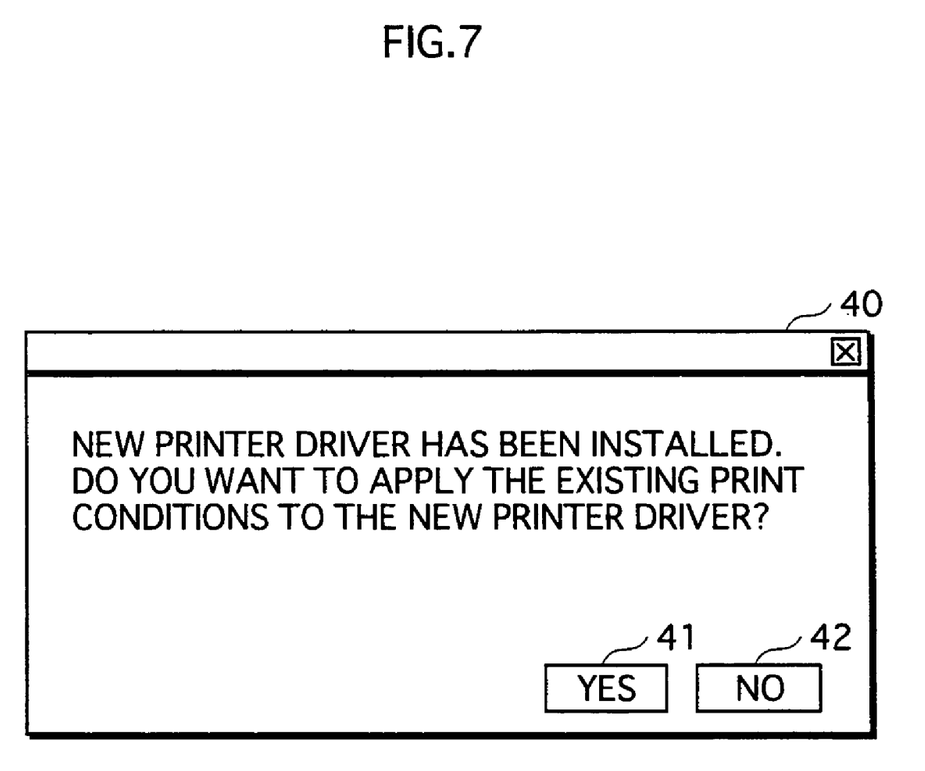
FIG. 7 is an example of a dialog box.

Upon confirming that the new driver has been installed in the terminal device 1 (Step S101: YES), the CPU 11 of the terminal device 1 displays the dialog box 40 saying "New printer driver has been installed. Do you want to apply the existing print conditions to the new printer driver?" or the like on the display 13, as FIG. 7 shows. The dialog box 40 notifies the user of the installation of the new printer driver, and requests the user to determine whether the existing print conditions should be inherited by the new printer driver (Step S102). An instruction indicating whether the conditions should be inherited by the new printer is received in Step S102.

If the user presses a "No" button 42 of the dialog box 40, in other words, if the user determines that the existing configuration should not be inherited by the new printer (Step S103: NO), the terminal device 1 finishes the procedure. In this case, the default configuration will be used by the new driver for each item.

Figure 8:
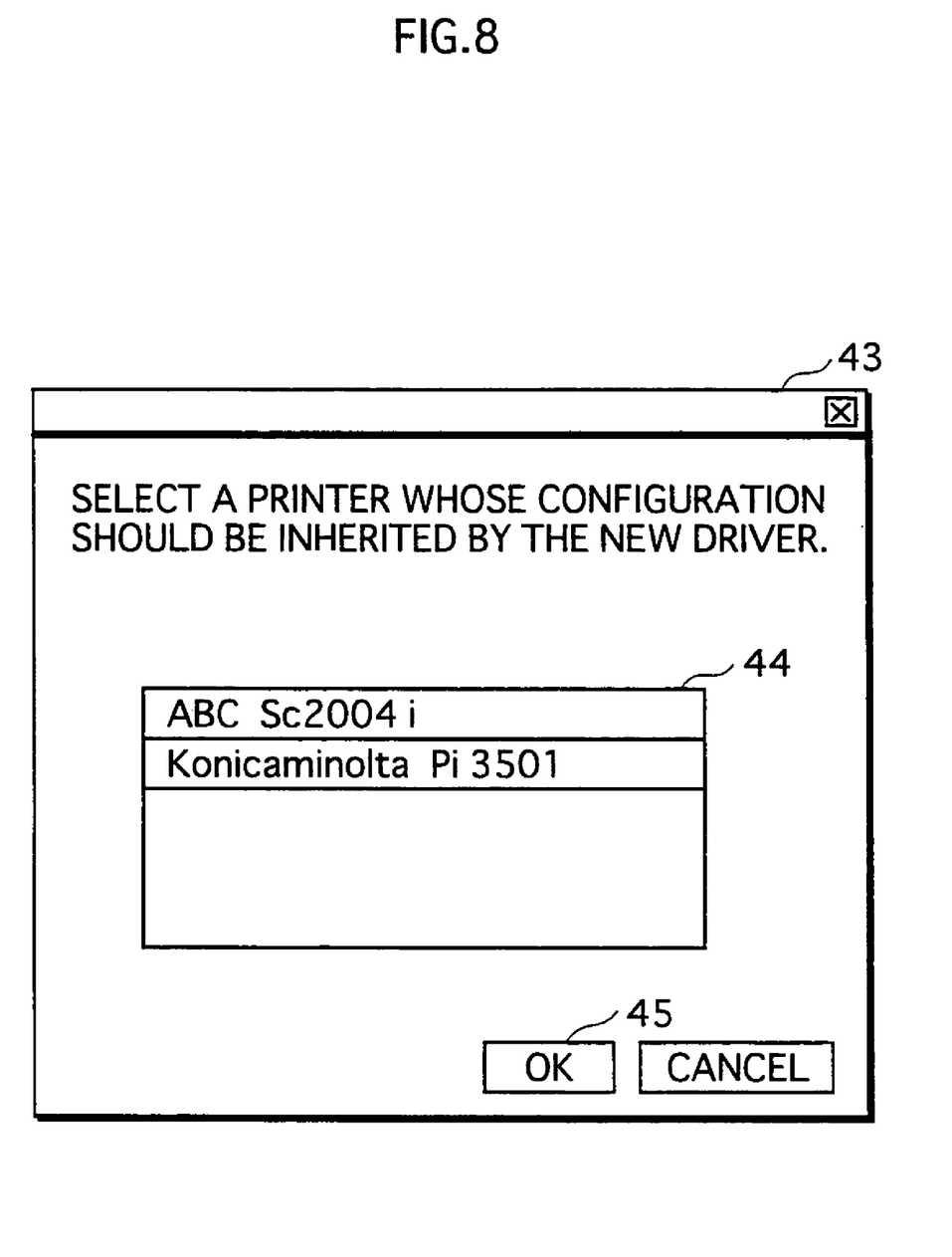
FIG. 8 is an example of a dialog box including a list of drivers.

Meanwhile, if the user presses a "YES" button 41 of the dialog box 40, in other words, if the user determines that the existing configuration should be inherited by the new driver (Step S103: YES), the CPU 11 searches for the driver already installed in the terminal device 1 (Step S104). Then, the CPU 11 displays a dialog box 43 on the display 13, as illustrated in FIG. 8. The dialog box 43 shows a message saying "Select a printer driver whose configuration should be inherited by the new driver" and a driver list 44 (Step S105).

Here, if the OS of the terminal device 1 is Windows (R) XP, the driver list 44 shows the drivers stored in the "Printer and Fax" folder in the "Control Panel". In this embodiment, a driver "ABC Sc2004i" which supports the printer 5 and a driver "Konicaminolta Pi3501" which supports the printer 6 are listed in the driver list 44.

The user selects a driver whose print conditions should be inherited by the new printer driver. In this embodiment, the user selects the driver "Konicaminolta Pi3501" and presses an "OK" button 45.

When the driver is selected by the user (Step S106), the CPU 11 reads the data included in the driver configuration file from the function configuration unit of the driver selected in Step S106 (This data is hereinafter called "the data 1") (Step S107). In this sense, Steps 105 and 106 are steps for receiving an indication from the user, regarding which of the already installed drivers should be compared with the new driver.

Next, the CPU 11 reads the data included in the driver configuration file from the function configuration driver unit of the newly installed driver (This data is hereinafter called "the data 2") (Step S108). Note that the default conditions are preset to the data 2, which corresponds to the new driver.

Then, upon reading the data 2, the CPU 11 counts the number of items included in the data 2, and obtains the total number of the items "N" (Step S109).

Next, the CPU 11 compares the $n^{th}$ item in the data 2 with each item in the data 1, and searches for an item that corresponds to the $n^{th}$ item in the data 2 (Step S110). Here, "n" increases from n=1.

If an item that corresponds to the $n^{th}$ item is found in the data 1 (Step S111: YES), and the value given to the corresponding item is within a range that the value of the $n^{th}$ item can take (Step S112: YES), the CPU 11 replaces the value given to the $n^{th}$ item in the data 2 with the value given to the corresponding item in the data 1 (Step S113).

If no item that corresponds to the $n^{th}$ item is found in the data 1 (Step S111: NO), the CPU 11 gives the default value to the $n^{th}$ item in the data 2 (Step S114).

If an item that corresponds to the $n^{th}$ item is found in the data 1, and if the value given to the corresponding item is not within the range that the $n^{th}$ item can take (Step S112: NO), the CPU 11 gives the default value to the $n^{th}$ item in the data 2 (Step S114). Note that the case where "the value given to the corresponding item is not within the rage that the $n^{th}$ item can take" is, for instance, the case where a value "11" is given to a certain item in the data 1, but the corresponding item in the data 2 can take only a value within a range from 1 to 10.

If n☐N, in other words, if not all the items in the data 2 have been searched for yet (Step S115: NO), "n" is incremented to be n=n+1 (Step S116). Then the processing returns to Step S110, and performs the succeeding Steps.

If n=N, in other words, if all the items in the data 2 have been searched for (Step S115: YES), the processing finishes.

Figure 9:
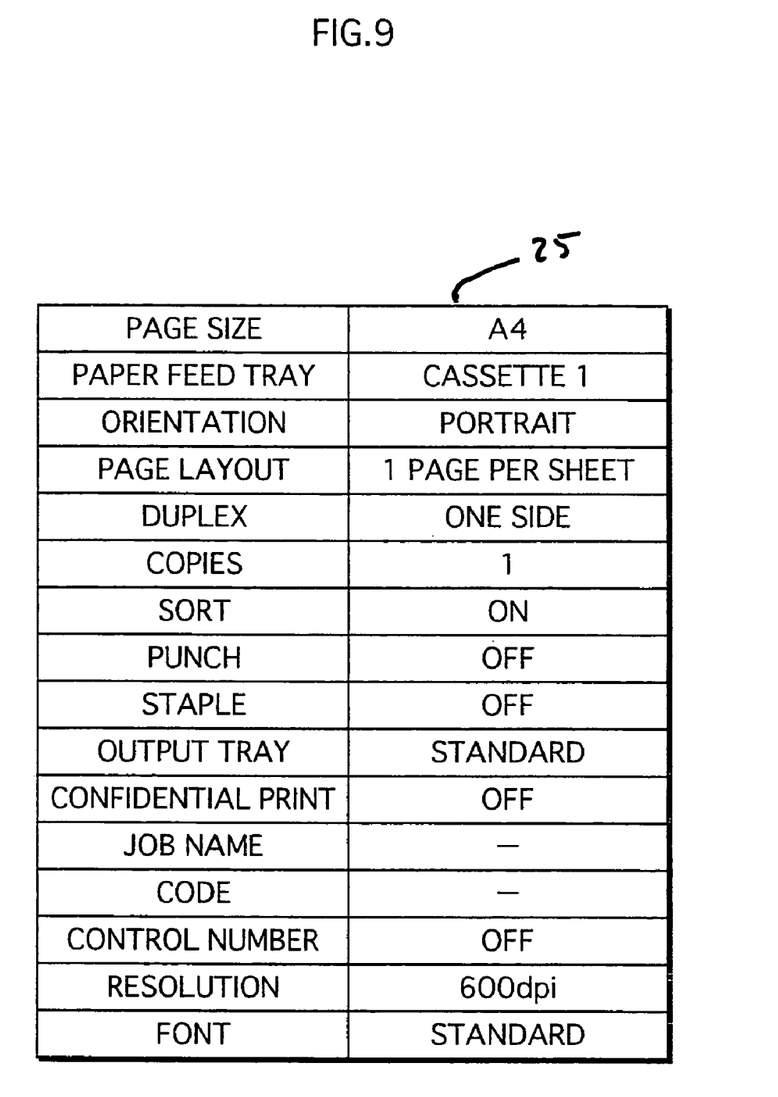
FIG. 9 shows data of a driver configuration file for a driver that is newly installed, in which each item of the data has a default value.

The following more specifically explains the Steps S109 to S115 based on this embodiment, with reference to FIG. 5 and FIG. 9. In this explanation, the data shown in FIG. 5 is the data included in the driver configuration file of the selected driver (corresponding to the above-described data 1), and the data shown in FIG. 9 is the data included in the driver configuration file of the new driver (corresponding to the above-described data 2). Note that the data shown in FIG. 9 is the default values that are preset to the new driver.

Firstly, the CPU 11 counts the total number "N" of the items included in the data 2 (Step S109). In this example, the total number "N" of the items included in the data 2 is sixteen as shown in FIG. 9.

The processing starts with the item of n=1, namely the first item included in the data 2. The first item of the data 2 is "document size", and the CPU 11 searches the data 1 for the corresponding item. Here, the item "document size" is included in the data 1 (Step S111: YES), and therefore the CPU 11 judges whether the value given to the "document size" of the data 1 is within the range that the value of the "document size" of the data 2 can take (Step S112). Here, the "document size" of the data 1 is "A4" and the "document size" of the data 2 also can take the value "A4" (Step S112: YES). Therefore, the CPU 11 gives the value "A4" to the item "document size" of the data 2 (Step S113).

In the next Step S115, n=1 and the total number of the items N=16. This means that n☐N (Step S115: NO). Accordingly, the processing proceeds to the next Step S116. In Step S116, "n" is incremented to be n=n+1. Now, "n" becomes n=2. Then, the processing returns to Step S110.

Next, regarding the second item "paper feed tray", the above-described Steps are to be performed in the same way. Here, as FIG. 9 shows, a default value "cassette 1" has been given to the item "paper feed tray" of the data 2. On the contrary, a value "cassette 3" has been given to the item "paper feed tray" of the data 1, as FIG. 5 shows. The item of the data 1 is to be inherited by the item of the data 2. In this case, the item "paper feed tray" of the data 2 is to be changed to "cassette 3" in Step 113.

Here, in the data 1, there is not an item corresponding to the ninth item of the data 2 "staple". In such a case, Step S111 is "NO" and accordingly the processing jumps to Step S114. In Step S114, a default value "off" is to be given to the item "staple" of the data 2.

In this way, as to cases where n=1 to n=16, the value given to each item of the data 1 is inherited by the data 2 through the above-described Steps. The total number of items "N" of the data 2 is sixteen, and accordingly, the terminal device finishes the procedure when "n" becomes n=16 (Step S115: YES).

Figure 10:
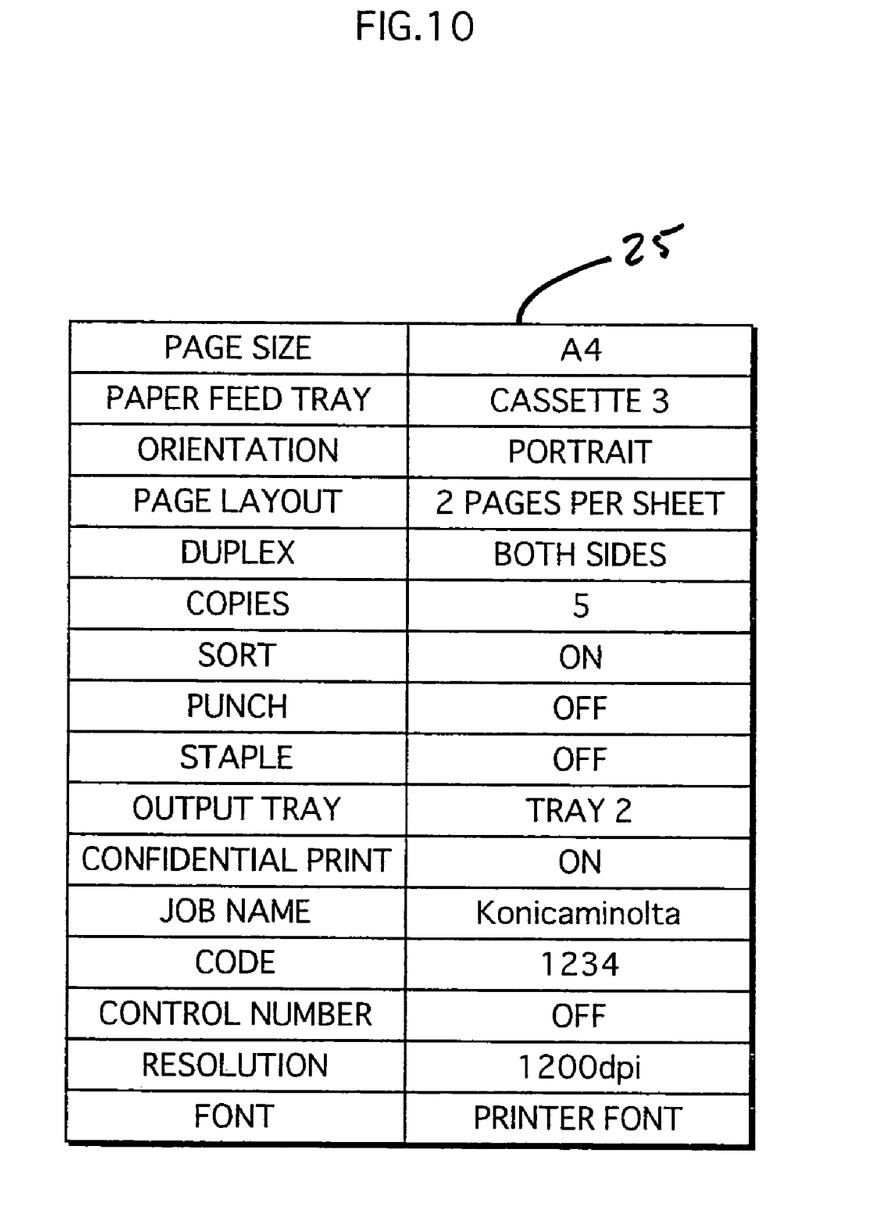
FIG. 10 shows data of a driver configuration file for a driver that is newly installed, in which each value is inherited from a selected driver.

FIG. 10 shows the data of the driver configuration file after being processed by the above-described Steps.

FIG. 10 and FIG. 5 shows that the values respectively given to the items of the configuration data of the driver selected in Step S106 (hereinafter called "the selected driver") are inherited by the items of the configuration data of the new driver. For instance, the items "paper feed tray: cassette 3", "page layout: 2 pages per sheet", and so on are inherited by the new driver.

With the stated structure, if the configuration data of the new driver includes the same items as the items included in the configuration data of the already installed driver, items for the already installed driver will be automatically inherited by items for the new driver. Accordingly, the user can save time configuring the new driver.

Further, with the stated structure, the user can immediately use the new printer with the configuration that the user is familiar with. This means that the structure provides for the convenience of the user.

Some printers have a function called "confidential print". With the structure having this function, the printer can store the print image, and print out the image only if the owner of the print is identified based on the password input to the printer and so on, instead of immediately printing out the image upon receiving the print job from the terminal device. This prevents leakage of the confidential information.

In the driver configuration file shown in FIG. 5, the "confidential print" is "ON", and the "job name" is "Konicaminolta", and the "code" is "1234". In such a case, the user can not print out the print data only by giving a print instruction to the printer from the terminal device 1. To print out the data, the user has to select the job name "Konicaminolta" from a list of "job names" displayed on the display panel of the printer, and input the code "1234".

For instance, assume that a new printer is newly connected to the terminal device 1 and a new driver is newly installed in the terminal device 1, in which the already installed driver has been configured so that the printer always performs the confidential print.

If this is the case, with the conventional structure, it is highly possible that the value "OFF" will be given to "confidential print" as FIG. 9 shows, because the default value is given to the "confidential print" when the new driver is installed. However, if the user believes that the "confidential print" is "ON" as usual, and gives a print instruction of a file including confidential information and so on to the new printer, the printer outputs the file immediately after receiving the print job. Therefore, the data will be printed out at a timing not expected by the user, and leakage of the confidential information might be caused.

On the contrary, in this embodiment, the value given to the "confidential print", which is "ON", is automatically inherited by the newly installed driver as FIG. 10 shows. Therefore, the embodiment prevents the above-described problem. That is to say, the data is prevented from being printed out at a timing that is not expected by the user. This means that the embodiment has an advantage from the viewpoint of security as well.

Furthermore, the items "job name" and "code" are also inherited by the new driver, and the user can use the confidential print with the familiar configuration. This provides for the convenience of the user as well.

The Second Embodiment

In the first embodiment, the printer 6 connected to the terminal device 1 is replaced by the different printer 7. Here, if the printer 7 is an upgraded version of the printer 6, the configuration of the driver for controlling the printer 6 (hereinafter called "the old driver") might be overwritten with the configuration of the driver for controlling the printer 7 (hereinafter called the "new driver") when the new driver is installed. In the second embodiment, the configuration of the old driver is inherited by the configuration of the new driver in such a case as well. This feature is different from the first embodiment.

Note that the following mainly describes the difference between the first embodiment and the second embodiment, and duplicative description is omitted here.

In this embodiment, the terminal device 1 includes a storing program for storing the configuration data in the HDD 16. If the user installs the new driver after executing the storing program in the terminal device 1, the driver configuration file of the old driver will be inherited by the new driver.

Figure 11:
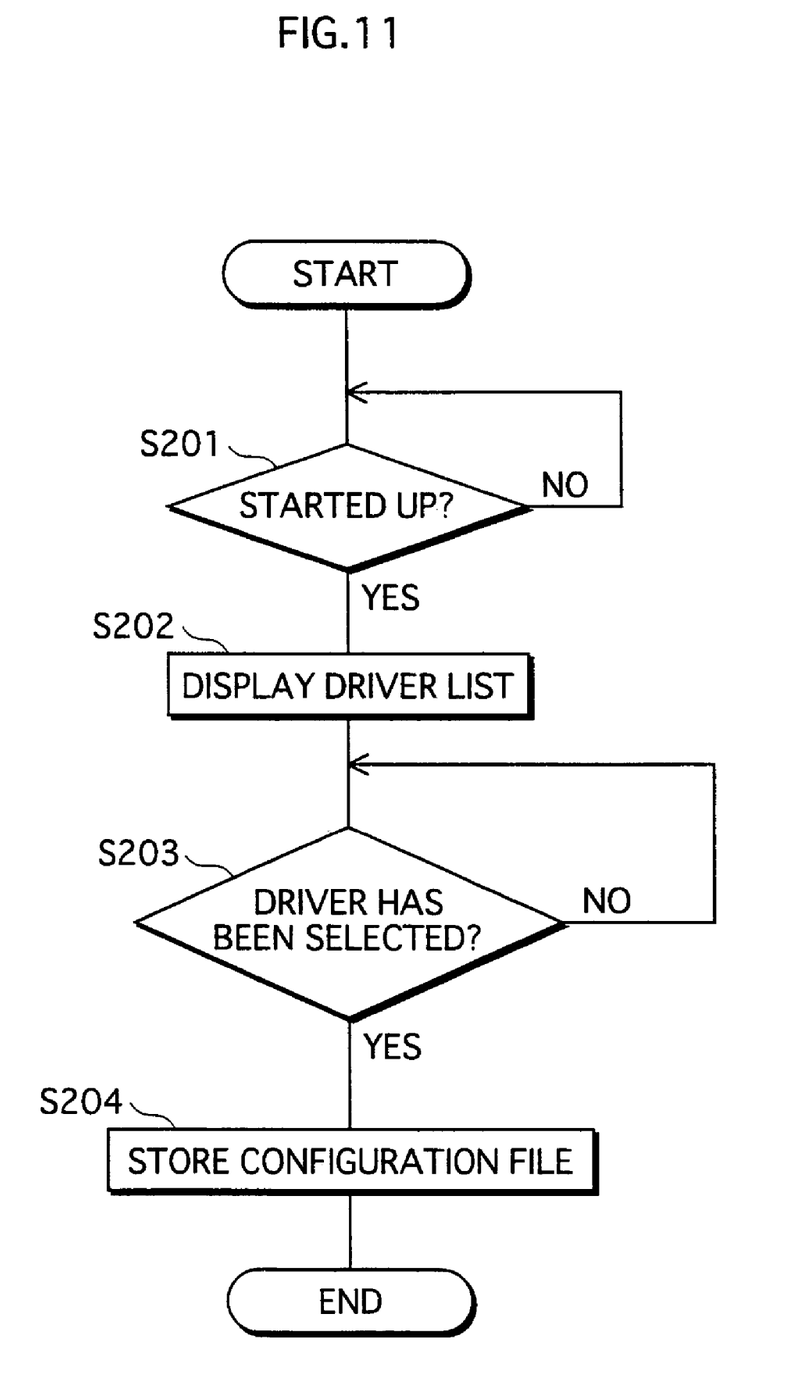
FIG. 11 is a flowchart showing an algorithm of a program used for storing a driver configuration file.
Figure 12:
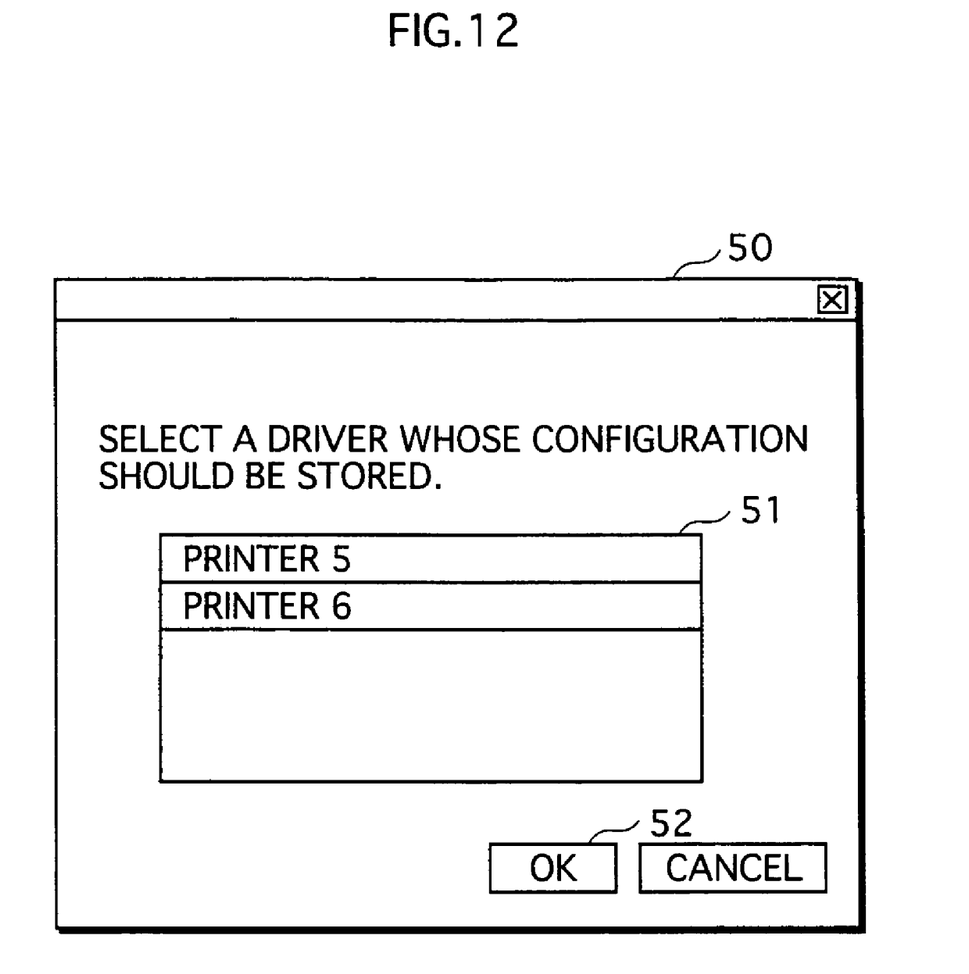
FIG. 12 shows an example of a dialog box.

FIG. 11 is a flowchart showing an algorithm of the storing program. When the user starts up the storing program (Step S201), the CPU 11 searches for the drivers installed in the terminal device 1, and displays a dialog box 50 showing a driver list 51 with a message saying "Select a driver whose configuration should be stored" (Step S202).

The user selects a driver, whose configuration should be stored, from the driver list 51. In this embodiment, the user selects the "printer 6" and presses the "OK" button 52.

After the "OK" button is pressed by the user (Step S203), the driver configuration file of the selected printer 6 is to be stored in a predetermined region (e.g. a driver configuration file storing region) in the HDD 16 (Step S204).

After the procedure shown in FIG. 11 finishes, the user installs the new driver in the terminal device 1. Triggered by this operation, the terminal device 1 performs the procedure shown in FIG. 6. Then, in Step S105, the CPU 11 of the terminal device 1 displays, the driver list that includes the driver configuration file stored in the driver configuration file storing region of the HDD 16 as well as the drivers searched in Step S104.

Accordingly, if the user selects the driver configuration file for the old driver in Step S106, the configuration of the old driver will be inherited by the new driver.

As described above, as the user installs the new driver after executing the storing program shown in FIG. 11, and executes the driver configuration program shown in FIG. 6, the driver configuration file for the old driver will be inherited by the new driver.

In this embodiment, the storing program shown in FIG. 11 is manually started up by the user, and the configuration data of the old driver is temporally stored in the memory, which is otherwise overwritten. However, the configuration data of the old driver may be automatically stored in the memory when the new driver is installed in the terminal device 1 and the terminal device 1 detects that the configuration data of the old driver will be rewritten. If this is the case, the stored configuration data of the old driver may be read after the overwriting is performed, and then shown in the driver list.

In this embodiment, it is assumed that the configuration data of the old driver is to be necessarily overwritten by the configuration data of the new driver when the new driver is installed. However, in the case where the configuration data of the old driver is not to be overwritten by the configuration data of the new driver, the configuration data of the old driver may be inherited by the configuration data of the new driver as described in the first embodiment.

<Modifications>

The present invention is described based on the embodiments. However, the present invention is not limited to the embodiments as a matter of course, and the following modifications are possible.

(1) In the first embodiment, the user selects a comparable driver in Step S106. However, the present invention is not limited to this. The terminal device 1 may automatically select the comparable driver. If this is the case, and if the OS of the terminal device 1 is the Windows (R) XP, the terminal device 1 may automatically select the driver for the "default printer" as the comparative printer among the drivers stored in the "printer and fax" folder included in the control panel.

(2) In the first embodiment, the corresponding items of only the driver selected by the user in Step S106 are searched for. However, the present invention is not limited to this. If a plurality of the drivers are installed, the corresponding items of each driver may be searched for. Here, if the value given to the same item is different among the drivers, the default value may be used for the new driver, or the user may select the value.

(3) In the first embodiment, the procedure for inheriting the configuration of the old driver is started when the new driver is installed. However, the procedure may be started during the installation of the new driver, or started after a certain period of time from the installment of the new driver finishes. Also, the procedure may be started after, for instance, the print configuration dialog box is started up.

(4) In the description above, the program having the algorithm shown in the flowchart of FIG. 6 is stored in the HDD 16 of the terminal device 1. However, the present invention is not limited to this. For instance, the program may be included in the new driver as an installer.

(5) In the description above, the user downloads the new driver from the server 3, and manually installs the new driver in the terminal device 1. However, the new driver may be automatically installed in the terminal device 1 via a network, using a technique called "network plug and play".

(6) In Step S111, if there is no corresponding item that corresponds to the item included in the new configuration data, in other words, if the new driver has a function different from the old driver, a notification, telling the user that the new driver has a new function, may be displayed. For instance, a dialog box (input receiving screen), which prompts the user to input the configuration and receives the input from the user, may be displayed.

(7) In the above-described embodiments, the case where the printer 6 connected to the terminal device 1 is replaced by the new printer 7, and the case where the driver is upgraded, are described. Therefore, after the new driver is installed, the terminal device 1 has a driver for a new printer having the same IP address as the old printer.

In such a case, Steps S107 to S115, namely the searching steps and the configuration steps may be performed in the first embodiment by comparing the new driver and a driver for controlling an image processing device having the same IP address as the old printer, if any, among the already installed drivers, instead of that the user selects the driver whose configuration should be inherited in Step S106 shown in FIG. 6.

In this case, the Steps may not be performed immediately. Step S105 may display a list, in which the already installed driver of the printer having the same IP address is pre-selected. With this structure, if an image processing device is replaced by a new image processing device having the same IP address, the configuration of the already installed driver will be inherited by the new driver. Accordingly, the user can use the new image processing device with the familiar configuration. This is a benefit to the user from the viewpoint of convenience.

Also, if this is the case in the second embodiment, and if the IP address of the new printer controlled by the new driver is the same as the IP address of the old printer controlled by the old driver, the storing program shown in FIG. 11 may be automatically executed. In this case, Step S204 may be immediately executed. Also, a list in which the already installed driver of the printer having the same IP address is pre-selected may be displayed instead.

(8) In the description above, the terminal device 1 and the printer 5 and so on are connected to each other via the LAN 4. However, the terminal device 1 and the printer 5 may be directly connected by a cable via a parallel port of the terminal device, not via the LAN 4.

(9) In the description above, the image processing device is a printer, and the device driver installed in the terminal device is a printer driver. However, the device driver is not limited to the printer driver as long as it is for controlling the processing conditions in accordance with the configuration determined by the user. For instance, the present invention is also applicable to the case where a new scanner driver is installed in a terminal device in which another scanner driver has been already installed. In this case, the configuration of the already installed scanner driver will be automatically inherited by the configuration of the new scanner driver. Accordingly, the user can save time for setting the configuration of the new scanner driver.

(10) The present invention may be the method described above, a computer program realizing the method, and a digital signal that constituting the computer program.

Also, the present invention may be a computer-readable recording medium, such as a flexible disk, a hard disk, a CD-ROM, an MO, a DVD, a DVD-ROM, a DVD-RAM, a BD (Blu-ray Disc), and a semiconductor memory on which the above-described computer program or the digital signal is recorded. Also, the present invention may be the computer program or the digital signal recorded on such a recording medium.

The present invention may transmit the above-described computer program or the digital signal via an electric communication line, a wireless or wired communication line, a network such as the Internet, a data broadcasting system, or the like.

The present invention may be a computer system including a microprocessor and a memory storing the above-described computer program, and the microprocessor may operates according to the computer program.

Another independent computer system may execute or process the computer program or the digital signal, which are recorded on the above-described recording medium and transferred, or transferred via the above-described network.

(11) The present invention may be a combination of any of the above-described embodiments and the modifications.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A device driver customizing method that is performed when a second driver is installed in an information processing device in which one or more first drivers each for controlling an image processing device have been already installed, the second driver being different from any of the first drivers, and the driver customizing method comprising:
    a searching step of comparing items included in first configuration data of any of the first drivers, which have been already configured by a user, with items included in second configuration data of the second driver, which are to be newly configured by the user, and thereby searching the first configuration data for an item corresponding to one of the items included in the second configuration data; and
    a configuration step of configuring the one of the items included in the second configuration data to have a same value as a value given to the corresponding item, if the corresponding item has been found by the searching step
    wherein if an address of the image processing device controlled by said any of the first drivers is the same as an address of an image processing device controlled by the second driver, the searching step searches the first configuration data of a first driver, among said one or more first drivers, which is for controlling the image processing device having the same address.

2. The device drive customizing method of claim 1, further comprising:
    a receiving step of receiving, from the user, an indication of a first driver, among said one or more first drivers, whose first configuration data should be searched.

3. The device driver customizing method of claim 1 wherein the configuration step configures the one of the items included in the second configuration data to have default value, if unable to configure the one of the items included in the second configuration data to have a same value as a value-given to the corresponding item.

4. The device driver customizing method of claim 1, wherein the configuration step configures the one of the items included in the second configuration data to have a default value, if the corresponding item has not been found by the searching step.

5. The device driver customizing method of claim 1, further comprising:
    an inheritance indication receiving step of receiving, from the user, an indication as to whether a value given to the corresponding item should be inherited by the one of the items included in the second configuration data, wherein
    the inheritance indication receiving step is performed prior to the searching step, and
    the searching step is performed only if the received indication indicates that the value given to the corresponding items should be inherited by the one of the items included in the second configuration data.

6. A computer readable recording medium containing a computer program that is executed when a second driver is installed in an information processing device in which one or more first drivers each for controlling an image processing device have been already installed, the second driver being different from any of the first drivers, and the driver customizing method comprising:
    a searching step of comparing items included in first configuration data of any of the first drivers, which have been already configured by a user, with items included in second configuration data of the second driver, which are to be newly configured by the user, and thereby searching the first configuration data for an item corresponding to one of the items included in the second configuration data; and
    a configuration step of configuring the one of the items included in the second configuration data to have a small value as a value given to the corresponding item, if the corresponding item has been found by the searching step wherein if an address of the image processing device controlled by said any of the first drivers is the same as an address of an image processing device controlled by the second driver, the searching step searches the first configuration data of a first driver, among said one or more first drivers, which is for controlling the image processing device having the same address.

7. The computer readable recording medium of claim 6, wherein the computer program further comprises:
a receiving step of receiving, from the user, an indication of a first driver, among said one or more first drivers, whose first configuration data should be searched.

8. The computer readable recording medium of claim 6, wherein the configuration step configures the one of the items included in the second configuration data to have a default value, if unable to configure the one of the items included in the second configuration data to have a same value as a value given to the corresponding item.

9. The computer readable recording medium of claim 6, wherein the configuration step configures the one of the items included in the second configuration data to have a default value, if the corresponding item has not been found by the searching step.

10. The computer readable recording medium of claim 6, wherein the computer program further comprises:
an inheritance indication receiving step of receiving an indication as to whether a value given to the corresponding item should be inherited by the one of the items included in the second configuration data, wherein
the inheritance indication receiving step is performed prior to the searching step, and
the searching step is performed only if the received indication indicates that the value given to the corresponding item should be inherited by the one of the items included in the second configuration data.

11. An information processing device, comprising:
a searching unit operable to compare items included in first configuration data of any of one or more first drivers each for controlling an image processing device, with items included in second configuration data of a second driver, and thereby search the first configuration data for an item corresponding to the one of the items included in the second configuration data, said one or more first drivers having been already installed in the information processing device, the items included in the first configuration data having been already configured by a user, and the items included in the second configuration data being to be newly configured by the user;
a configuration unit operable to configure the one of the items included in the second configuration data to have a same value as a value given to the corresponding item, if the corresponding item has been found by the searching unit
a judging unit operable to judge whether an address of the image processing device controlled by said any of the first drivers is the same as an address of an image processing device controlled by the second driver; and
a control unit operable, if the judging unit judges in the affirmative, to cause the searching unit to search the first configuration data of a first driver, among said one or more first drivers, which is for controlling the image processing device having the same address.

12. The information processing device of claim 11, further comprising:
a receiving unit operable to receive, from the user, an indication of a first driver, among said one or more first drivers, whose first configuration data should be searched.

13. The information processing device of claim 11, wherein the configuration unit configures the one of the items included in the second configuration data to have a default value, if unable to configure the one of the items included in the second configuration data to have a same value as a value given to the corresponding item.

14. The information processing device of claim 11, wherein the configuration unit configures the one of the items included in the second configuration data to have a default value, if the corresponding item has not been found by the searching unit.

15. The information processing device of claim 11, further comprising:
an inheritance indication receiving unit operable to receive, from the user, an indication as to whether a value given to the corresponding item should be inherited by the one of the items included in the second configuration data, wherein
a control unit operable to cause the searching unit and the configuration unit to operate only if the received indication indicates that the value given to the corresponding item should be inherited by the ofne of the items included in the second configuration data.

* * * * *